US010761548B2

(12) United States Patent
Mugunda et al.

(10) Patent No.: US 10,761,548 B2
(45) Date of Patent: Sep. 1, 2020

(54) SYSTEMS AND METHODS FOR PROVIDING SENSOR INFORMATION FROM AN INTELLIGENT DEVICE FOR CLOSED-LOOP THERMAL CONTROL

(71) Applicant: Dell Products L.P., Round Rock, TX (US)

(72) Inventors: Chandrasekhar Mugunda, Austin, TX (US); Yogesh P. Kulkarni, Round Rock, TX (US); Sruthi Reddy Mothukupally, Cedar Park, TX (US); Larry Liangzhong Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 15/945,534

(22) Filed: Apr. 4, 2018

(65) Prior Publication Data

US 2019/0310666 A1 Oct. 10, 2019

(51) Int. Cl.
*G05D 23/19* (2006.01)
*G05B 15/02* (2006.01)
*G06F 1/20* (2006.01)

(52) U.S. Cl.
CPC ......... *G05D 23/1917* (2013.01); *G05B 15/02* (2013.01); *G06F 1/206* (2013.01)

(58) Field of Classification Search
CPC ...... G05D 23/1917; G05B 15/02; G06F 1/206
See application file for complete search history.

(56) References Cited

U.S. PATENT DOCUMENTS 7,245,099 B2 * 7/2007 Yamamoto .............. G06F 1/206 318/268
8,122,265 B2 * 2/2012 Radhakrishnan ..... G06F 1/3203 711/100
10,209,750 B2 * 2/2019 Marripudi ............... G06F 1/206
2012/0248207 A1 * 10/2012 Drake ................ G05D 23/1931 236/51
2014/0008448 A1 * 1/2014 Liu .................... G05D 23/1902 236/94

(Continued)

*Primary Examiner* — Chad G Erdman
(74) *Attorney, Agent, or Firm* — Jackson Walker L.L.P.

(57) ABSTRACT

A method for use in an information handling system comprising a processor, an information handling resource communicatively coupled to the processor, the information handling resource including a controller and a temperature sensor for sensing a temperature associated with the information handling resource, and a management controller communicatively coupled to the processor and the information handling resource, and having stored thereon a program of instructions configured to perform thermal management of the information handling system, may be provided. The method may include periodically communicating information indicative of the temperature from the information handling resource to the management controller, storing by the management controller the information indicative of the temperature in a data record associated with the temperature sensor, and based on information stored in the data record, performing by the program of instructions closed-loop thermal management of the information handling system.

12 Claims, 2 Drawing Sheets

(56) References Cited

U.S. PATENT DOCUMENTS

| | | | | |
|---|---|---|---|---|
| 2016/0091945 | A1* | 3/2016 | Shabbir | G06F 1/3203<br>713/300 |
| 2016/0291654 | A1* | 10/2016 | Iyer | G06F 1/206 |
| 2019/0012107 | A1* | 1/2019 | P Gopi | G06F 16/24565 |

* cited by examiner

SYSTEMS AND METHODS FOR PROVIDING SENSOR INFORMATION FROM AN INTELLIGENT DEVICE FOR CLOSED-LOOP THERMAL CONTROL

TECHNICAL FIELD

The present disclosure relates in general to information handling systems, and more particularly to systems and methods for providing sensor information from an intelligent device for closed-loop thermal control in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One challenge in the industry is providing power and thermal budget support of third-party information handling resources in an information handling system. This is particularly true in instances in which a third-party information handling resource is a smart device which has its own controller and own temperature sensors and it is desired to use such sensor information in a closed-loop thermal control algorithm.

SUMMARY

In accordance with the teachings of the present disclosure, the disadvantages and problems associated with maintaining forward compatibility of custom thermal settings in information handling systems may be substantially reduced or eliminated.

In accordance with embodiments of the present disclosure, an information handling system may include a processor, an information handling resource communicatively coupled to the processor, the information handling resource including a controller and a temperature sensor for sensing a temperature associated with the information handling resource, and a management controller communicatively coupled to the processor and the information handling resource, and having stored thereon a program of instructions configured to perform thermal management of the information handling system. The information handling resource may be configured to periodically communicate information indicative of the temperature to the management controller. The management controller may be configured to store the information indicative of the temperature in a data record associated with the temperature sensor. Based on information stored in the data record, the program of instructions may perform closed-loop thermal management of the information handling system.

In accordance with these and other embodiments of the present disclosure, a method for use in an information handling system comprising a processor, an information handling resource communicatively coupled to the processor, the information handling resource including a controller and a temperature sensor for sensing a temperature associated with the information handling resource, and a management controller communicatively coupled to the processor and the information handling resource, and having stored thereon a program of instructions configured to perform thermal management of the information handling system, may be provided. The method may include periodically communicating information indicative of the temperature from the information handling resource to the management controller, storing by the management controller the information indicative of the temperature in a data record associated with the temperature sensor, and based on information stored in the data record, performing by the program of instructions closed-loop thermal management of the information handling system.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in an information handling system comprising an information handling resource, the information handling resource including a controller and a temperature sensor for sensing a temperature associated with the information handling resource, and a management controller communicatively coupled to the information handling resource, configured to perform thermal management of the information handling system: periodically receive at the management controller information indicative of the temperature from the information handling resource, store by the management controller the information indicative of the temperature in a data record associated with the temperature sensor, and based on information stored in the data record, perform closed-loop thermal management of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
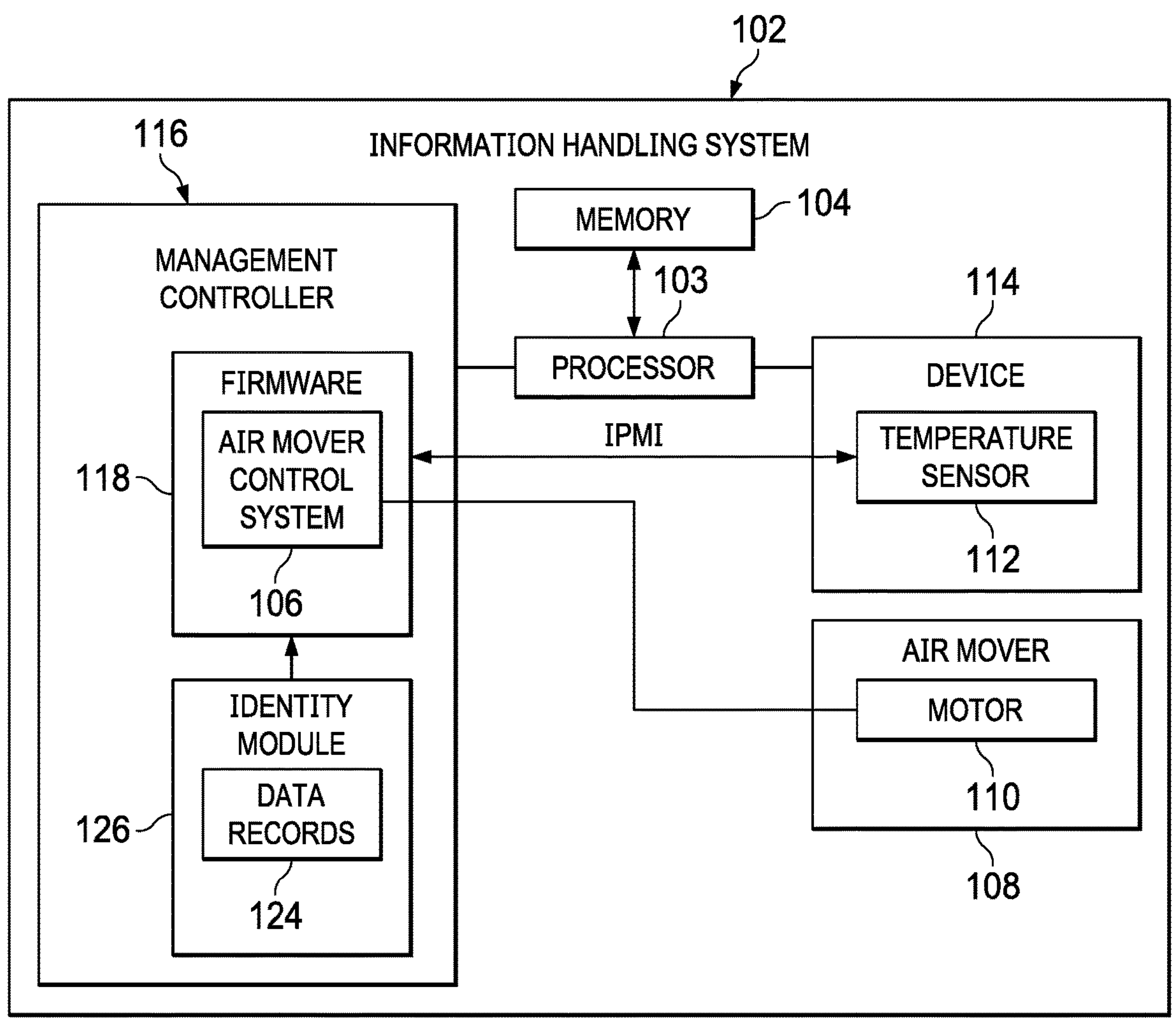
FIG. 1 illustrates a block diagram of an example information handling system, in accordance with the present disclosure.
Figure 2:
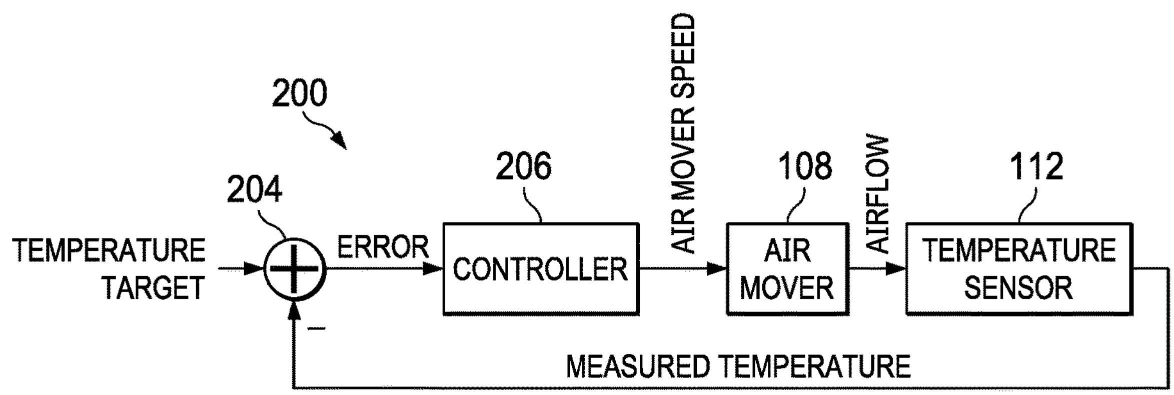
FIG. 2 illustrates a block diagram depicting an example thermal control loop that may be implemented by an air mover control system, in accordance with embodiments of the present disclosure.
Figure 3:
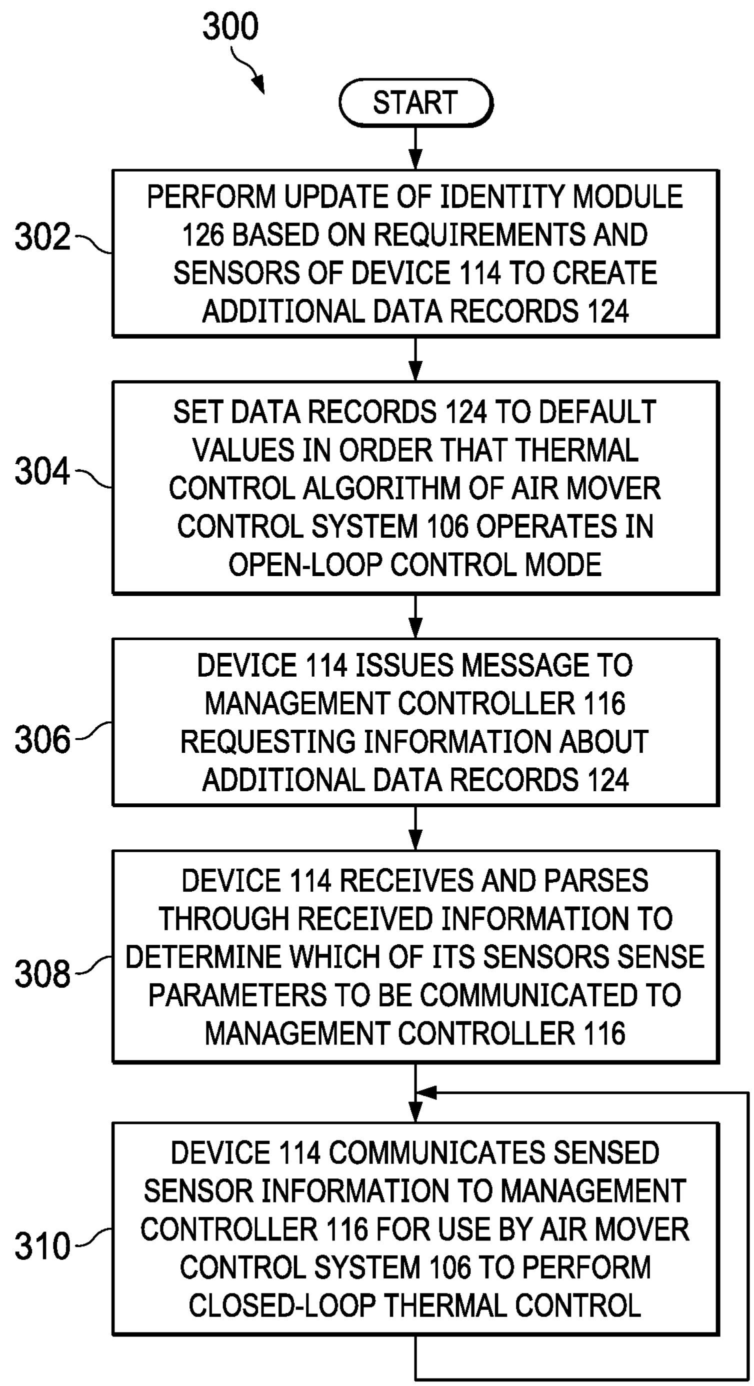
FIG. 3 illustrates a flow chart of an example method for providing sensor information from an intelligent device for closed-loop thermal control, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover 108, one or more devices 114, and a management controller 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may be communicatively coupled to air mover control system 106 of management controller 116, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heatsinks (not explicitly shown) internal to the enclosure to cool one or more information handling resources.

Device 114 may be communicatively coupled to processor 103 and may generally include any information handling resource. In some embodiments, device 114 may comprise a PCIe device. In these and other embodiments, device 114 may comprise a smart device which includes its own controller and a temperature sensor 112. Temperature sensor 112 may be any system, device, or apparatus (e.g., a thermometer, thermistor, etc.) configured to generate an electrical signal indicative of a sensed temperature within or proximate to device 114.

Management controller 116 may be configured to provide out-of-band management facilities for management of information handling system 102. Such management may be made by management controller 116 even if information handling system 102 is powered off or powered to a standby state. Management controller 116 may include a processor, memory, an out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118 and identity module 126. Firmware 118 may include a program of executable instructions configured to be read and executed by management controller 118 in order to carry out the functionality of management controller 118, including that functionality described herein. For example, firmware 118 may embody an air mover control system 106.

Air mover control system 106 may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116) and based on such signals and thermal parameters, calculate an air mover driving signal to maintain an appropriate level of cooling, increase cooling, or decrease cooling, as appropriate, and communicate such air mover driving signal to air mover 108.

Identity module 126 may comprise a map, list, array, table, or other suitable data structure with one or more entries, each entry setting forth power parameters and/or thermal parameters regarding an information handling resource of information handling system 102. As shown in FIG. 1, identity module 126 may include one or more data records 124. A data record may be any suitable data entry which includes sensor information communicated from device 114 (e.g., information from temperature sensor 112, temperature requirements, etc.).

In addition to processor 103, memory 104, air mover control system 106, air mover 108, temperature sensor 112, device 114, and management controller 116, information handling system 102 may include one or more other information handling resources.

In operation, a two-step process may enable communication of temperature sensor 112 information from device 114 to management controller 116 for closed-loop thermal control of information handling system 102. The first step may involve updating identity module 126 (e.g., via a field update) based on requirements and sensors of device 114 in order to create additional data records 124 to be stored within management controller 116 for the thermal control algorithm implemented by air mover control system 106. For example, such additional data records 124 may include a data record for storing a temperature signal generated by temperature sensor 112 and/or information communicated from device 114 regarding thermal requirements for device 114 (e.g., a maximum temperature for device 114).

Once the update of identity module 126 is complete, the additional data records 124 added to management controller 116 may be set to default values (e.g., a maximum value for a temperature signal communicated from device 114) in order that the thermal control algorithm of air mover control system 106 operates in an open-loop control mode (e.g., a "worst case" setting for providing thermal control for all thermal conditions). Such data records 124 may be created with special flags or other variables set to indicate that data in such data records is communicated from device 114 (e.g., indicating that such data is received via Intelligent Platform Management Interface (IPMI) SetSensorReading command).

In the second step, device 114 may issue an appropriate message (e.g., an IPMI getSDR command) to management controller 116 requesting information about additional data records 124. Device 114 may then receive and parse through such information to determine which of its sensors sense parameters to be communicated to management controller 116. For such identified sensors (e.g., temperature sensor 112), device 114 may periodically communicate sensed sensor information to management controller 116 (e.g., via an IPMI SetSensorReading command), for closed-loop thermal control by air mover control system 106.

Thus, for normal operating conditions, the thermal control algorithm of air mover control system 106 may regularly receive temperature information from device 114, and control air mover 108 accordingly to maintain a temperature associated with device 114 within thermal requirements for device 114. In some embodiments, air mover control system 106 may institute a timeout, such that if temperature data is not timely communicated from device 114, a default temperature value associated with temperature sensor 112 may be applied within air mover control system 106 which may cause air mover control system 106 to perform open-loop thermal control.

FIG. 2 illustrates a block diagram depicting an example thermal control loop that may be implemented by air mover control system 106, in accordance with embodiments of the present disclosure. As shown in FIG. 2, example control loop 200 may include a summer 204, a controller 206, air mover 108, and temperature sensor 112. In some embodiments, portions of example control loop 200 may be implemented by air mover control system 106. For example, in such embodiments, summer 204 and controller 206 may be implemented by air mover control system 106.

Summer 204 may comprise any system, device, or apparatus for calculating an error between a temperature target and a measured temperature sensed by temperature sensor 112. Controller 206 may comprise any system, device, or apparatus configured to, based on the error calculated by summer 204, generate an air mover driving signal indicative of a desired speed for air mover 108. In some embodiments, the air mover driving signal may comprise a pulse-width modulation (PWM) signal, in which the width of a pulse of a periodic square wave signal may be indicative of a desired operating velocity for air mover 108. In these and other embodiments, controller 206 may be implemented using a proportional-integral-differential (PID) controller.

Air mover 108 may operate at a speed which is a function of the air mover driving signal, and based on the speed of air mover 108 and airflow impedance of the airflow path of air driven by air mover 108, air mover 108 may generate an airflow. Such airflow may provide cooling proximate to temperature sensor 112.

FIG. 3 illustrates a flow chart of an example method 300 for providing sensor information from an intelligent device for closed-loop thermal control, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen. In these and other embodiments, method 300 may be implemented as firmware, software, applications, functions, libraries, or other instructions.

At step 302, a user (e.g., an administrator) of information handling system 102 may perform an update of identity module 126 based on requirements and sensors of device 114 in order to create additional data records 124 to be stored within management controller 116 for the thermal control algorithm implemented by air mover control system 106. At step 304, the additional data records 124 added to management controller 116 may be set to default values (e.g., a maximum value for a temperature signal communicated from device 114) in order that the thermal control algorithm of air mover control system 106 operates in an open-loop control mode.

At step 306, device 114 may issue an appropriate message (e.g., an IPMI getSDR command) to management controller 116 requesting information about additional data records 124. At step 308, device 114 may receive and parse through such information to determine which of its sensors sense parameters to be communicated to management controller 116. At step 310, device 114 may periodically communicate sensed sensor information to management controller 116 (e.g., via an IPMI SetSensorReading command), for use by air mover control system 106 to perform closed-loop thermal control.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using management controller 116, device 114, components thereof, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:

a processor;

an information handling resource communicatively coupled to the processor, the information handling resource including a controller and a temperature sensor for sensing a temperature associated with the information handling resource; and a management controller communicatively coupled to the processor and the information handling resource, and having stored thereon a program of instructions configured to perform thermal management of the information handling system;

wherein:

the management controller is configured to receive information regarding the information handling resource and create a data record associated with the temperature sensor;

the information handling resource is configured to receive a plurality of data records from the management controller;

the information handling resource is configured to determine, based on the received plurality of data records, the data record associated with the temperature sensor;

the information handling resource is configured to periodically communicate information indicative of the temperature to the management controller to update the data record associated with the temperature sensor; and based on information stored in the data record, the program of instructions is configured to perform closed-loop thermal management of the information handling system;

wherein the periodically communicating is in response to receiving an indication of a presence of the data record.

2. The information handling system of claim 1, wherein the data record is created in response to an update of an identity module of the management controller.

3. The information handling system of claim 1, wherein the information handling resource and the management controller are configured to communicate via Intelligent Platform Management Interface.

4. The information handling system of claim 1, wherein the management controller is configured to, in an absence of periodic receipt of the information indicative of the temperature from the information handling resource, apply a default value to the data record such that the program of instructions is configured to perform open-loop thermal management of the information handling system.

5. A method comprising, in an information handling system comprising a processor, an information handling resource communicatively coupled to the processor, the information handling resource including a controller and a temperature sensor for sensing a temperature associated with the information handling resource, and a management controller communicatively coupled to the processor and the information handling resource, and configured to perform thermal management of the information handling system:

the management controller receiving information regarding the information handling resource and creating a data record associated with the temperature sensor;

the information handling resource receiving a plurality of data records from the management controller;

the information handling resource determining, based on the received plurality of data records, the data record associated with the temperature sensor;

periodically communicating information indicative of the temperature from the information handling resource to the management controller to update the data record associated with the temperature sensor; and based on information stored in the data record, performing closed-loop thermal management of the information handling system;

wherein the periodically communicating is in response to receiving an indication of a presence of the data record.

6. The method of claim 5, further comprising creating the data record in response to an update of an identity module of the management controller.

7. The method of claim 5, wherein the information handling resource and the management controller are configured to communicate via Intelligent Platform Management Interface.

8. The method of claim 5, further comprising, in an absence of periodic receipt of the information indicative of the temperature from the information handling resource, applying by the management controller a default value to the data record such that the management controller performs open-loop thermal management of the information handling system.

9. An article of manufacture, comprising a non-transitory computer readable medium; and computer-executable instructions carried on the computer readable medium, the instructions readable by a processor, the instructions, when read and executed, for causing the processor to, in an information handling system comprising an information handling resource, the information handling resource including a controller and a temperature sensor for sensing a temperature associated with the information handling resource, and a management controller communicatively coupled to the information handling resource, configured to perform thermal management of the information handling system:

cause the management controller to receive information regarding the information handling resource and create a data record associated with the temperature sensor;

cause the information handling resource to receive a plurality of data records from the management controller;

cause the information handling resource to determine, based on the received plurality of data records, the data record associated with the temperature sensor;

periodically receive at the management controller information indicative of the temperature from the information handling resource to update the data record associated with the temperature sensor; and based on information stored in the data record, perform closed-loop thermal management of the information handling system;

wherein the periodically communicating is in response to receiving an indication of a presence of the data record.

10. The article of claim 9, the instructions for further causing the processor to create the data record in response to an update of an identity module of the management controller.

11. The article of claim 9, wherein the information handling resource and the management controller are configured to communicate via Intelligent Platform Management Interface.

12. The article of claim 9, the instructions for further causing the processor to, in an absence of periodic receipt of the information indicative of the temperature from the information handling resource, apply by the management controller a default value to the data record such that the management controller is configured to perform open-loop thermal management of the information handling system.

* * * * *